May 14, 1963  J. G. KASTLER ET AL  3,089,946

STUD WELDER

Filed May 8, 1961

INVENTORS
RICHARD F. SARO
BY JOSEPH G. KASTLER

ATTORNEYS

3,089,946
STUD WELDER

Joseph G. Kastler, Detroit, and Richard F. Saro, Huntington Woods, Mich., assignors to Deweld, Inc., Oak Park, Mich., a corporation of Michigan
Filed May 8, 1961, Ser. No. 108,539
6 Claims. (Cl. 219—98)

Our invention relates to stud welders and the like, and more particularly to an improved electric welding system arranged and adapted for maximum portability.

Heretofore, electric welding equipment has been of such size and weight that, in order to weld in inaccessible places or at heights in buildings, the power supply had to remain on the ground and excessively long power cables had to be supplied to the welding gun. Also, heretofore hand welding guns have been made too large and heavy, due to complexities of operation and high forces required as in percussion welding, to be effectively used in confined spaces or to be used for any length of time by the operator.

We have solved many such problems, first by simplifying the method of drawing the initial arc; next by reducing bulk of equipment through use of smaller and simpler components, these being the primary objects of the invention.

The recent trend in stud welding has been toward percusssion systems in which the current from a condenser storage circuit is used to initially melt a small stud tip, after which a percussion blow is mechanically applied to the stud. An older method which we use is to produce, by a novel improved device, a momentary spark gap between the stud and the weldment member which causes initial flow of metal.

We have also provided a high current contact relay incorporating a novel simplified method to avoid sticking of the contact points, permitting use of smaller and fewer components to effect weight and space saving in the power unit itself.

For a more complete understanding of these and other objects and advantages of the present invention, reference may be had to the accompanying drawing illustrating a preferred embodiment of our invention in which like reference characters refer to like parts throughout the several views and in which FIG. 1 is a preferred electric circuit embodying the invention.

Figure 1:
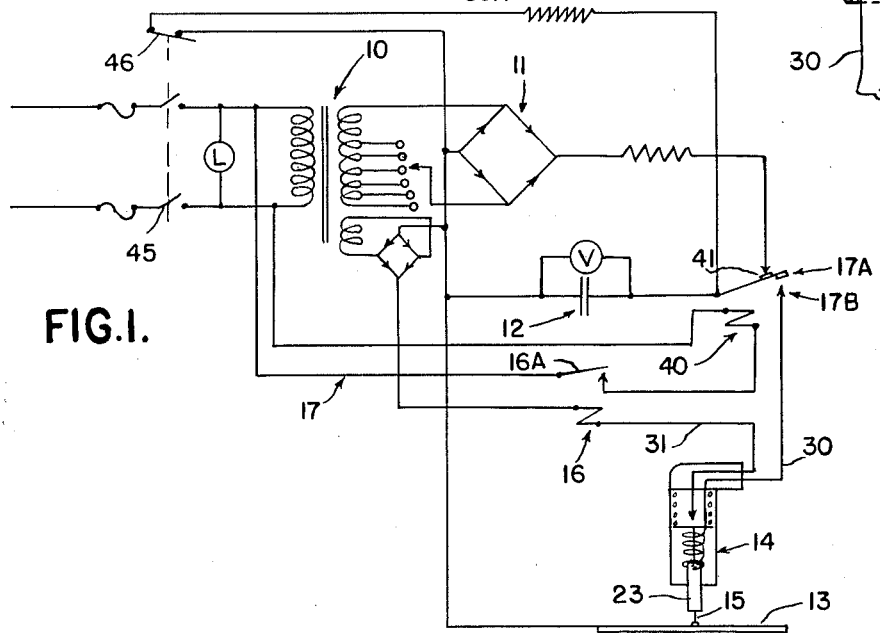

As shown in FIG. 1, input current is boosted through a transformer 10 and rectified by a conventional bridge circuit 11 for loading condensers 12, one side of which being connected to a weldment member 13.

A welding gun 14, holding a stud 15, is placed to contact the weldment member 13 with the stud 15, a low current control circuit 16 is actuated to close a relay 16A, energizing a relay circuit 17 to close contact elements 17A and 17B, discharging the condensers 12 through the stud 15 and simultaneously opening the loading side of the condenser circuit.

Figure 2:
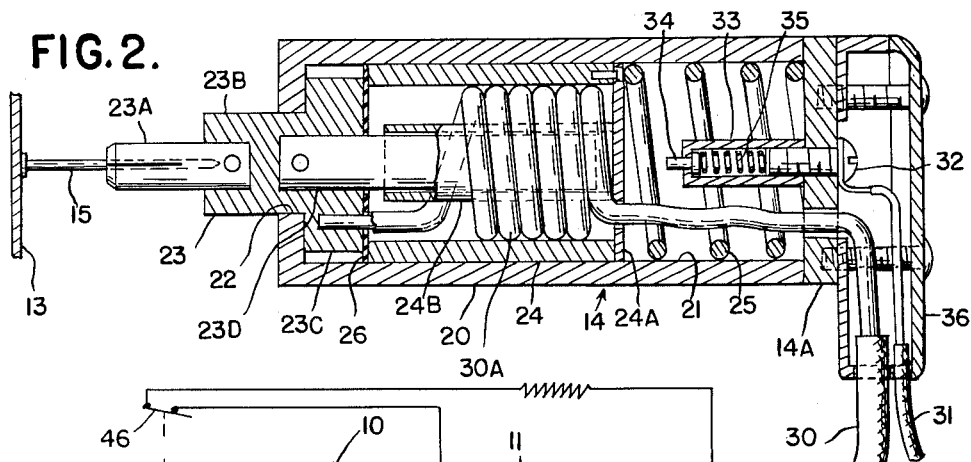
FIG. 2 is a longitudinal cross-sectional view of a manual welding gun employed in the system.

FIG. 2 illustrates the improved gun 14 as comprising a housing 20 which has a chamber 21 and an end bore 22. Stud holder 23, having exterior portions 23A and 23B and an enlarged interior portion 23C is retained by the housing 20 and adapted for sliding movement in the chamber 21.

A piston assembly 24 is slidably carried in the chamber 21, being urged forward by a spring 25 abutting the rear end 14A of the housing 14. A resiliently compressible washer 26 or the like is disposed intermediate the forward end of the piston 24 and the inner or rearward end of the holder portion 23C.

A plate 24A is mounted on the inner end of the piston assembly 24 and carries a sleeve 24B as shown.

A soft iron core element 23D is mounted on the holder portion 23C and is slidably disposed in the sleeve 24B.

The high current lead-in cable 30 passes into the chamber 21, is coiled as shown at 30A around the sleeve 24B in the piston 24, and terminates in an electrical connection to the holder 23.

A lead 31 from the control circuit 16 is connected as illustrated to a screw 32 which retains a sleeve 33 on the inner side of the end 14A of the housing 14. A firing pin 34 is retained in the sleeve 33 and urged outwardly by a spring 35.

The leads 30 and 31 are enclosed as shown in an end cap 36, and the housing end 14A is of di-electric material.

In use, the pin, nail or stud 15 contacts the weldment member 13. Manual pressure on the gun 14 compresses the spring 25, effecting retraction of the piston 24 and holder 23 until the plate 24A contacts the firing pin 34, connecting the lead 31 to the weldment member 13 (in effect, grounding it) through the firing pin 34, piston 24, holder 23 and stud 15, thus actuating the control circuit 16 and relay circuit 17 to close the contacts 17A and 17B, closing the welding circuit and discharging the condensers 12 through the lead 30.

High current flow through the coil 30A produces a magnetic field much as in a solenoid to attract the core 23D, compressing the washer 26 to effect a slight but sudden retraction of the holder 23. This momentarily separates the stud 15 from the weldment member 13 creating an arc which melts the adjacent surfaces of the stud 15 and weldment member 13. Pressure of the spring 25 immediately returns the stud 15 to the weldment member 13 for completion of welding on the remaining condensed discharge.

The general idea of providing an initial separation to draw an arc is not new, having been shown for example in Patent No. 1,410,421, issued to L. J. Steele et al., on Mar. 21, 1922, but heretofore the idea has not been practically effected in the present manner in a portable hand gun.

Figure 3:
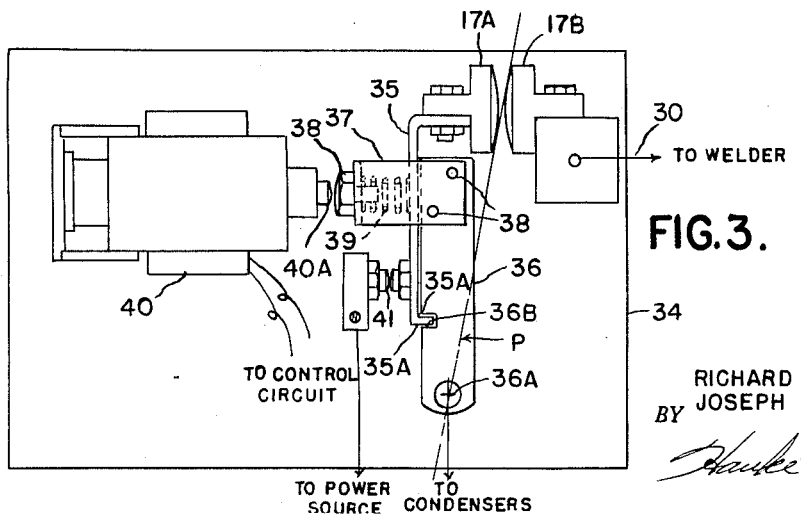
FIG. 3 is an elevational view of the contact relay of the present system.

The mechanism for making contact in the condenser circuit is illustrated in FIG. 3. The contact elements 17A and 17B are provided with convex contact surfaces as shown. One element 17B is mounted stationary on a support plate 34. The other element 17A is secured to an arm 35 carried on the side of a lever 36 pivotally mounted as at 36A on the plate 34. The end of the arm 35 is bent as at 35A to engage in a slot 36B in the lever 36.

A bracket 37 is secured as by rivets 38 to the lever 36 and carries a screw 38 which serves as a guide for a spring 39 which resiliently retains the arm 35 in place against the side of the lever 36.

A solenoid 40 is mounted as shown so that, when energized, its plunger 40A extends to engage the head of the screw 38 and force the arm 35 and lever 36 clockwise as shown to contact the element 17A against the element 17B, discharging the condensers, connected to the lever 36, through the welder lead 30.

A second set of contacts 41, connected to the power source, are separated on the above action, one being stationary and the other being carried by the arm 35.

The plunger 40A, after moving the contacts 17A and 17B together, continues to thrust against the screw 38, forcing the lever further clockwise. At the moment of contact of the elements 17A and 17B, the point of abutment 35A between the arm 35 and the lever 36 is offset from the plane P containing the axis of the pivot 36A and the point of contact of the elements 17A and 17B. Further motion moves the point 35A toward the plane, causing an increase in the dimension between the pivot 36A and the point of contact of the elements 17A and 17B. Further motion moves the point 35A toward this plane, causing an increase in the dimension between the pivot 36A and the contact element 17A, the arm 35 pivoting on the point 35A is a fulcrum away from the lever 36. This produces a sliding motion of the element 17A against the element 17B, preventing any tendency toward fusing as the stored condenser current flows through the elements 17A and 17B.

The mechanism of FIG. 3 is so carried that when the solenoid 40 is de-energized, the lever 36 pivots counterclockwise to separate the elements 17A and 17B and to connect the elements 41 for recharging the condensers.

In FIG. 1, it will be noted that main switches 45 are ganged to a switch 46 in a further circuit connected across the condensers 12 so that, when the switches 45 are opened to de-activate the equipment, the switch 46 will close to discharge the condensers 12 and eliminate the dangers inherent in a charged high voltage condenser system.

The use of this simplified mechanism, having the antifusing function as above described, permits weight and bulk reduction in the components of the power and control circuits, to facilitate portability.

Although we have described only one embodiment of our invention, it will be apparent to one skilled in the art to which the invention pertains that various changes and modifications may be made therein without departing from the spirit of the invention and the scope of the appended claims.

We claim:

1. In an electric stud welding system, an electrical circuit comprising a control circuit and a condenser circuit, a weldment member to which a stud is to be welded connected to one side of said condenser circuit, a stud holding mechanism comprising a housing having a retractable stud holder and means resiliently urging said holder toward an extended position, said holder being connected to the opposite side of said condenser circuit from the weldment member and adapted to carry a stud for contact with said weldment member, means effecting discharge of said condenser circuit between the stud and the weldment member, and retraction means responsive to and actuated by discharge of said condenser circuit to suddenly momentarily retract said stud holder to produce an arc gap between said stud and said weldment member simultaneously with initial discharge of said condenser circuit.

2. The system as defined in claim 1 and in which said retraction means comprises a solenoid carried in said housing and operable on energization to retract said stud holder, said solenoid being connected with said condenser circuit for energization on discharge thereof.

3. The system as defined in claim 1 and in which said retraction means comprises a solenoid carried in said housing and operable on energization to retract said stud holder, said solenoid being connected in series with said condenser circuit for energization on discharge thereof.

4. In an electric stud welding system, an electrical circuit comprising a control circuit and a condenser circuit, a weldment member to which a stud is to be welded and connected to one side of said condenser circuit, a welding gun comprising a housing having a chamber, a stud holder slidable in said chamber and extending therefrom, said stud holder adapted to hold a stud for engagement with said weldment member, a stop element in said chamber, compressible means intermediate said stop element and the inner end of said stud holder, said condenser circuit being connected on the other side with the stud holder, a solenoid coil carried by said stop element and operable on energization to retract said stud holder with respect to the stop element, said coil being connected with and energized only by discharge of said condenser circuit to suddenly momentarily retract said stud holder on discharge to produce an arc gap between said stud and said weldment member.

5. The system as defined in claim 4 and in which said coil is connected in series with the portion of the condenser circuit connected to said stud holder.

6. The system as defined in claim 4 and in which said stop element is slidable in said chamber, means resiliently urging said stop element outwardly, a contact element carried by said housing and adapted to make contact with said stop element upon retraction thereof by forces applied through the housing when the stud is pressed against the weldment member, said stop element and said contact element being connected on opposite sides of said control circuit and operable to initiate discharge of said condenser circuit.

References Cited in the file of this patent

UNITED STATES PATENTS

| | | |
|---|---|---|
| 2,145,724 | Horsley | Jan. 31, 1939 |
| 2,191,494 | Nelson | Feb. 27, 1940 |
| 2,319,763 | Humphrey | May 18, 1943 |
| 2,413,189 | Nelson | Dec. 24, 1946 |
| 2,416,454 | Morton et al. | Feb. 25, 1947 |
| 2,467,379 | Graham | Apr. 19, 1949 |
| 2,510,101 | Graham | June 6, 1950 |
| 2,625,630 | Eckles | Jan. 13, 1953 |
| 2,685,630 | Graham | Aug. 3, 1959 |
| 2,938,105 | Kelemen et al. | May 24, 1960 |